United States Patent [19]

Buchter

[11] Patent Number: 4,958,818

[45] Date of Patent: Sep. 25, 1990

[54] CLAMPING BLOCK

[75] Inventor: Beat Buchter, Hallau, Switzerland

[73] Assignee: Buchter Formenbau AG, Switzerland

[21] Appl. No.: 387,535

[22] Filed: Jul. 31, 1989

[30] Foreign Application Priority Data

Aug. 11, 1988 [CH] Switzerland ........................ 3035/88

[51] Int. Cl.[5] ........................................ B23Q 3/02

[52] U.S. Cl. ........................................ 269/136

[58] Field of Search ........................ 269/137–138, 269/244, 246–248, 250–253

[56] References Cited

U.S. PATENT DOCUMENTS 3,506,253 4/1970 Swenson ............................ 269/137

OTHER PUBLICATIONS

American Machinist, "Add Springs to Fixture To Get Downward Clamping", Feb. 4, 1952.

*Primary Examiner*—Robert C. Watson

*Attorney, Agent, or Firm*—Ralph W. Selitto, Jr.

[57] ABSTRACT

When used as holder for tools for partial machining tasks or as clamping means for exchangeable tools, the clamping block for clamping workpieces or tools make it possible to carry out a rapid and precisely reproducible exchange of the object (7) to be clamped. The clamping block having a block base (1) and a clamping jaw (5) which can be displaced relative thereto comprises a fixed clamping jaw (3) and means (4, 4.2) for the at least approximately parallel guidance of the moveable clamping jaw (5) relative to the block base. The latter has an essentially L-shaped form with two legs (1.1, 1.2) of approximately equal length. One of these carries the fixed clamping jaw (3) and a nose-shaped supporting portion (4) having a wedge-shaped control surface (4.2) for the moveable clamping jaw (5) while the other has a table-shaped portion (8) on which means for lateral and transverse guidance of the moveable clamping jaw (5) are supported.

6 Claims, 1 Drawing Sheet

CLAMPING BLOCK

The present invention relates to a clamping block for clamping workpieces or tools in accordance with the preamble of patent claim 1 in reproducibly exact alignment in relation to an object in the form of a tool or a workpiece.

For clamping workpieces or tools the use of clamping devices which are designed either for general or individual clamping tasks and accordingly have parallel-clamping jaws or clamping jaws aligned with the object to be held is known. Here it is customary, in the case of parallel-clamping jaws, to design one of these to be fixed and to design the second to be moveable in virtually the same plane by spindle or lever actuation. In the case of all-round clamping devices, e.g. drill chucks or turning collets, on the other hand, individually moveable clamping jaws are customary, said jaws being moveable along a wedge surface and being forced concentrically into clamping engagement against the object to be held. It is advantageous here that large clamping forces can be generated in compact arrangements by appropriate selection of the wedge angle and a workpiece or tool can be reliably clamped with a relatively small actuating force.

It is the object of the invention to create a clamping block which is suitable, in particular, for flat workpieces or tools having parallel-surfaced clamping regions and which can be mounted on a spindle, a piston, a plate etc. and can be provided with a fixed jaw and a moveable jaw, the latter being moveable along complementary sloping or wedge surfaces and being tightened against the fixed jaw by means of a spindle or screw.

The solution of this object according to the invention is defined by the defining features of patent claim 1. Embodiments thereof emerge from the dependent claims.

In addition to the fact that it can be of compact design, the advantages of the clamping block according to the invention are, in particular, clamping parts which can be produced with precision in a simple manner and a clamping range which can be of relatively large configuration. By virtue of the downward-directed force component during the tightening of the moveable jaw, the object to be clamped is automatically drawn against a lower stop surface, precise reproducible clamping therefore being achievable.

An exemplary embodiment of the invention is illustrated below reference to the drawing, in which.

Figures 1, 2, 3, 4:
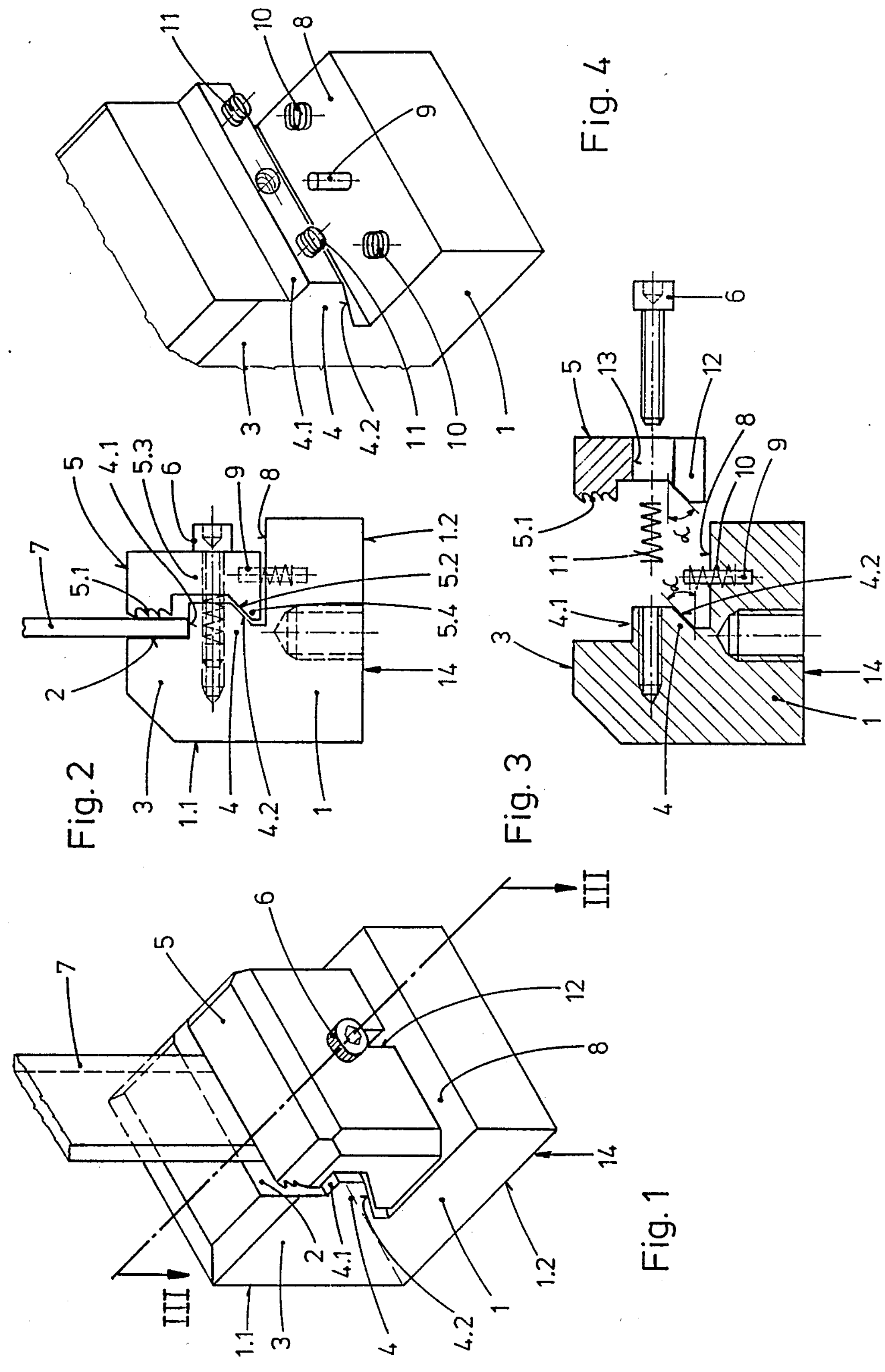
FIG. 1 shows a clamping block in perspective representation.
FIG. 2 shows the clamping block according to FIG. 1 in side view.
FIG. 3 shows an exploded representation of the clamping block in section in accordance with the line III—III in FIG. 1.
FIG. 4 shows the base portion of the clamping block in partial perspective view to illustrate the spring suspension for the floating mounting of the moveable jaw.

The block base 1 of approximately L-shaped form with two legs 1.1, 1.2 of approximately equal length includes on its front side the clamping surface 2 of a fixed clamping jaw 3, which is expediently of integral design with the block base 1. Adjoining the block-side (inner) end of the clamping surface 2 is a supporting portion 4 projecting in the form of a nose, which portion has a stop surface 4.1 which lies at right angles to the clamping surface 2 and can be used as clamping-depth reference surface when clamping a workpiece or a tool. The supporting portion 4 further comprises a control or wedge surface 4.2 at an angle $\alpha$ of 40 to 60° to the axis of rotation of a clamping screw 6, for the transverse guidance of a moveable clamping jaw 5 which can be pressed against an object 7 to be clamped in the clamping block by means of the clamping screw 6 (or a spindle). The principal surfaces on the moveable clamping jaw 5 are the clamping surface 5.1 which protrudes above a plate zone 5.3 and like the clamping surface 2 on the fixed clamping jaw 3 can be provided with a transversely running fluting or another surface structure which increases grip, and a wedge surface 5.2 which is formed on a projection 5.4 on the plate zone 5.3 and the slope of which runs complementarily to the control or wedge surface 4.2 on the supporting portion 4. In the rest condition of the moveable clamping jaw 5, said clamping jaw rests in a position of equilibrium which is determined by first and second spring elements 10 and 11 inserted at the supporting portion 4 and by the clamping screw 6. The spring element 10 and 11, for example helical springs inserted in spring housings at a table-shaped portion 8 of the block base 1 and on the protruding supporting portion 4, are at right angles to one another and, with the clamping screw 6 released, provide a floating mounting for the moveable clamping jaw 5 above the table-shaped portion 8 of the block base 1. By suitable dimensioning of the spring elements 10, 11 it can be ensured that, with the screw 6 released, the moveable clamping jaw 5 comes to rest virtually parallel to the fixed clamping jaw 3. The latter is centered in the transverse direction by a pin 9 which is seated in the table-shaped portion 8 and engages in a laterally directed slot 12 in the moveable clamping jaw 5.

When the screw 6 is tightened the moveable clamping jaw 5 raised from the table-shaped portion 8 by the first spring elements 10 is first of all brought into contact either with the object 7 to be clamped or with the wedge surface 4.2 against the pressure of the second spring elements 11. The oscillatory movement arising during this procedure at the moveable clamping jaw 5 is possible by virtue of a screw recess 13 designed as a slot thereon. If the screw 6 is turned further, the moveable clamping jaw 5 comes to rest completely both against the object 7 and against the wedge surface 4.2. As soon as the wedge surfaces 4.2 and 5.2 rest against one another, the moveable clamping jaw 5 moves parallel to the fixed clamping jaw 3 towards the table-shaped portion 8, with the result that satisfactory parallel clamping of the object 7 results.

The bearing surface 14, which can be situated at the top, at the bottom or at the side depending on the use position of the clamping block, can be provided with centering means (not shown) such as fitting pins, fitting bores, templates etc., and clamping elements. Thus, when the clamping block is used as clamping means for exchangeable tools or as holder for tools for partial machining tasks, a rapid and precisely reproducible exchange can take place.

I claim:

1. A clamping block for clamping workpieces or tools comprising: an essentially L-shaped block base having a first leg and a second leg, said first leg and said second leg being of about equal length, said first leg having a fixed clamping jaw thereon, said fixed clamping jaw having a front face including a first clamping surface and a projecting support portion, said support portion having a clamping reference surface and a wedge-shaped control surface, and said second leg having a moveable clamping jaw connected thereto, said moveable clamping jaw including a second clamping surface opposite and parallel to said first clamping surface of said fixed clamping jaw and a wedge surface complementary and opposite to said control surface of said fixed clamping jaw, said second leg also including first guidance means for the approximately parallel guidance of said moveable clamping jaw relative to said front face of said fixed clamping jaw, a top face perpendicular to said front face of said fixed clamping jaw and second guidance means for the lateral and transverse guidance of said moveable clamping jaw relative to said top face of said second leg, said second guidance means including a pin and at least one spring element protruding perpendicularly from said top face; and clamping screw means for displacing said moveable clamping jaw relative to said block base, whereby said wedge surface of said moveable clamping jaw may be brought into contact with said control surface of said fixed clamping jaw.

2. A clamping block as claimed in claim 1, wherein the wedge surface of the moveable clamping jaw is formed on a projection facing the support portion of the fixed clamping jaw.

3. A clamping block as claimed in claim 1, wherein the control surface of the support portion of the fixed clamping jaw and the wedge surface of the moveable clamping jaw slope at an angle of 40 to 60° to the axis of rotation of the clamping screw means.

4. A clamping block as claimed in claim 1, wherein the moveable clamping jaw is spring-loaded relative to the support portion of the fixed clamping jaw, whereby a floating support of the moveable clamping jaw on the block base results when the clamping screw means is released.

5. A clamping block as claimed in claim 2, wherein the moveable clamping jaw is spring-loaded relative to the support portion of the fixed clamping jaw, whereby a floating support of the moveable clamping jaw on the block base results when the clamping screw means is released.

6. A clamping block as claimed in claim 3, wherein the moveable clamping jaw is spring-loaded relative to the support portion of the fixed clamping jaw, whereby a floating support of the moveable clamping jaw on the block base results when the clamping screw means is released.

* * * * *